(12) United States Patent
Hazenbroek

(10) Patent No.: US 8,678,176 B2
(45) Date of Patent: Mar. 25, 2014

(54) SHACKLE ALIGNMENT SYSTEM AND METHOD

(75) Inventor: Jacobus Eliza Hazenbroek, Oud-Beijerland (NL)

(73) Assignee: Foodmate BV (NL)

( * ) Notice: Subject to any disclaimer, the term of this patent is extended or adjusted under 35 U.S.C. 154(b) by 499 days.

(21) Appl. No.: 13/011,056

(22) Filed: Jan. 21, 2011

(65) Prior Publication Data

US 2011/0253504 A1 Oct. 20, 2011

(30) Foreign Application Priority Data

Apr. 19, 2010 (DK) .................................. N2004573

(51) Int. Cl.
*B65G 47/244* (2006.01)
(52) U.S. Cl.
USPC .......................................... 198/680; 198/375
(58) Field of Classification Search
None
See application file for complete search history.

(56) References Cited

U.S. PATENT DOCUMENTS

| | | | |
|---|---|---|---|
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,180,152 A | 12/1979 | Sefcik |
| 4,203,178 A | 5/1980 | Hazenbroek |

(Continued)

FOREIGN PATENT DOCUMENTS

| | | |
|---|---|---|
| DE | 603 16 104 T2 | 6/2008 |
| EP | 0 444 782 A1 | 9/1991 |
| EP | 0 786 208 A1 | 7/1997 |
| EP | 2 181 841 A1 | 5/2010 |

OTHER PUBLICATIONS

International Search Report and Written Opinion dated Sep. 15, 2011 for PCT/NL2011/050268.

(Continued)

*Primary Examiner* — Kavel Singh
(74) *Attorney, Agent, or Firm* — Womble Carlyle Sandridge & Rice, LLP

(57) ABSTRACT

A conveyor is disclosed for moving and positioning objects along a conveyor path. The conveyor includes a conveyor rail extending along the conveyor path and at least one carriage having a rotatable article support mounted for movement along the conveyor rail. A turning block associated with the rotatable article support facilitates rotatable movement of the article support when the turning block is rotated. The conveyor further includes an aligning station for rotating the article support into a predetermined position when the turning block passes through the aligning station as the article support moves through the aligning station. The turning may be formed with a first disk with a first perimeter contour and a second disk with a second perimeter contour. The alignment station has projections in the form of pins for engaging the second disk as needed for rotating the turning block and article support between indexed orientations until the article support is oriented in a predetermined desired orientation. The article support may be a poultry shackle for suspending poultry carcasses and moving them along the conveyor path.

9 Claims, 5 Drawing Sheets

(56) References Cited

U.S. PATENT DOCUMENTS

| | | | |
|---|---|---|---|
| 4,283,813 | A | 8/1981 | House |
| 4,292,709 | A | 10/1981 | van Mil |
| 4,388,811 | A | 6/1983 | Zebarth |
| 4,395,795 | A | 8/1983 | Hazenbroek |
| 4,406,037 | A | 9/1983 | Hazenbroek |
| 4,418,444 | A | 12/1983 | Meyn et al. |
| 4,418,445 | A | 12/1983 | Meyn et al. |
| 4,434,526 | A | 3/1984 | van Mil |
| 4,439,891 | A | 4/1984 | van Mil |
| 4,468,838 | A | 9/1984 | Sjöström et al. |
| 4,510,886 | A | 4/1985 | van Mil |
| 4,514,879 | A | 5/1985 | Hazenbroek |
| 4,516,290 | A | 5/1985 | van Mil |
| 4,524,489 | A | 6/1985 | van Mil |
| 4,558,490 | A | 12/1985 | Hazenbroek et al. |
| 4,559,672 | A | 12/1985 | Hazenbroek et al. |
| 4,567,624 | A | 2/1986 | van Mil |
| 4,570,295 | A | 2/1986 | van Mil |
| 4,574,429 | A | 3/1986 | Hazenbroek |
| 4,577,368 | A | 3/1986 | Hazenbroek |
| D283,289 | S | 4/1986 | Hazenbroek |
| 4,593,432 | A | 6/1986 | Hazenbroek |
| 4,597,133 | A | 7/1986 | van den Nieuwelaar |
| 4,597,136 | A | 7/1986 | Hazenbroek |
| 4,635,317 | A | 1/1987 | van der Eerden |
| 4,639,973 | A | 2/1987 | van der Eerden |
| 4,639,974 | A | 2/1987 | Olson |
| 4,639,975 | A | 2/1987 | van der Eerden |
| 4,646,384 | A | 3/1987 | van der Eerden |
| 4,651,383 | A | 3/1987 | van der Eerden |
| 4,653,147 | A | 3/1987 | van der Eerden |
| 4,682,386 | A | 7/1987 | Hazenbroek et al. |
| 4,704,768 | A | 11/1987 | Hutting et al. |
| 4,723,339 | A | 2/1988 | van den Nieuwelaar et al. |
| 4,724,581 | A | 2/1988 | van den Nieuwelaar |
| 4,736,492 | A | 4/1988 | Hazenbroek |
| RE32,697 | E | 6/1988 | Hazenbroek et al. |
| 4,765,028 | A | 8/1988 | van den Nieuwelaar et al. |
| 4,766,644 | A | 8/1988 | van den Nieuwelaar et al. |
| 4,769,872 | A | 9/1988 | Hazenbroek et al. |
| 4,779,308 | A | 10/1988 | van den Nieuwelaar et al. |
| 4,788,749 | A | 12/1988 | Hazenbroek et al. |
| 4,811,456 | A | 3/1989 | Huevel |
| 4,811,458 | A | 3/1989 | v.d. Nieuwelaar et al. |
| 4,811,462 | A | 3/1989 | Meyn |
| 4,813,101 | A | 3/1989 | Brakels et al. |
| 4,884,318 | A | 12/1989 | Hazenbroek |
| 4,893,378 | A | 1/1990 | Hazenbroek |
| 4,894,885 | A | 1/1990 | Markert |
| 4,896,399 | A | 1/1990 | Hazenbroek |
| 4,899,421 | A | 2/1990 | Van Der Eerden |
| 4,918,787 | A | 4/1990 | Hazenbroek |
| 4,928,351 | A | 5/1990 | van den Nieuwelaar et al. |
| 4,935,990 | A | 6/1990 | Linnenbank |
| 4,939,813 | A | 7/1990 | Hazenbroek |
| 4,958,694 | A | 9/1990 | van den Nieuwelaar et al. |
| 4,965,908 | A | 10/1990 | Meyn |
| 4,972,549 | A | 11/1990 | van den Nieuwelaar et al. |
| 4,993,113 | A | 2/1991 | Hazenbroek |
| 4,993,115 | A | 2/1991 | Hazenbroek |
| 5,001,812 | A | 3/1991 | Hazenbroek |
| 5,013,431 | A | 5/1991 | Doets |
| 5,015,213 | A | 5/1991 | Hazenbroek |
| 5,019,013 | A | 5/1991 | Hazenbroek |
| 5,026,983 | A | 6/1991 | Meyn |
| 5,035,673 | A | 7/1991 | Hazenbroek |
| 5,037,351 | A | 8/1991 | van den Nieuwelaar et al. |
| 5,041,054 | A | 8/1991 | van den Nieuwelaar et al. |
| 5,045,022 | A | 9/1991 | Hazenbroek |
| 5,060,596 | A | 10/1991 | Esbroeck |
| 5,064,402 | A | 11/1991 | Koops |
| 5,067,927 | A | 11/1991 | Hazenbroek et al. |
| 5,069,652 | A | 12/1991 | Hazenbroek |
| 5,074,823 | A | 12/1991 | Meyn |
| 5,088,959 | A | 2/1992 | Heemskerk |
| 5,090,940 | A | 2/1992 | Adkison |
| 5,098,333 | A | 3/1992 | Cobb |
| 5,104,351 | A | 4/1992 | van den Nieuwelaar et al. |
| 5,122,090 | A | 6/1992 | van den Nieuwelaar et al. |
| 5,123,871 | A | 6/1992 | van den Nieuwelaar et al. |
| 5,125,498 | A | 6/1992 | Meyn |
| 5,147,240 | A | 9/1992 | Hazenbroek et al. |
| 5,147,241 | A | 9/1992 | Rudin |
| 5,154,664 | A | 10/1992 | Hazenbroek et al. |
| 5,154,665 | A | 10/1992 | Hazenbroek |
| RE34,149 | E | 12/1992 | Markert |
| 173,077 | A | 12/1992 | van den Nieuwelaar et al. |
| 5,173,076 | A | 12/1992 | Hazenbroek |
| 5,176,563 | A | 1/1993 | van den Nieuwelaar et al. |
| 5,176,564 | A | 1/1993 | Hazenbroek |
| 5,178,890 | A | 1/1993 | van den Nieuwelaar et al. |
| 5,186,679 | A | 2/1993 | Meyn |
| 5,188,559 | A | 2/1993 | Hazenbroek |
| 5,188,560 | A | 2/1993 | Hazenbroek |
| 5,194,035 | A | 3/1993 | Dillard |
| 5,197,917 | A | 3/1993 | Verbakel et al. |
| 5,199,922 | A | 4/1993 | Korenberg et al. |
| 5,222,905 | A | 6/1993 | Van den Nieuwelaar et al. |
| 5,242,324 | A | 9/1993 | Koops |
| 5,248,277 | A | 9/1993 | Bos et al. |
| 5,256,101 | A | 10/1993 | Koops |
| 5,269,721 | A | 12/1993 | Meyn |
| 5,277,649 | A | 1/1994 | Adkison |
| 5,277,650 | A | 1/1994 | Meyn |
| 5,279,517 | A | 1/1994 | Koops |
| 5,290,187 | A | 3/1994 | Meyn |
| 5,299,975 | A | 4/1994 | Meyn |
| 5,299,976 | A | 4/1994 | Meyn |
| 5,318,428 | A | 6/1994 | Meyn |
| 5,326,311 | A | 7/1994 | Persoon et al. |
| 5,334,083 | A | 8/1994 | van den Nieuwelaar et al. |
| 5,336,127 | A | 8/1994 | Hazenbroek |
| 5,340,351 | A | 8/1994 | Minderman et al. |
| 5,340,355 | A | 8/1994 | Meyn |
| 5,342,237 | A | 8/1994 | Kolkman |
| 5,344,359 | A | 9/1994 | Kolkman |
| 5,344,360 | A | 9/1994 | Hazenbroek |
| 5,366,406 | A | 11/1994 | Hobbel et al. |
| 5,370,574 | A | 12/1994 | Meyn |
| 5,372,246 | A | 12/1994 | van Aalst |
| RE34,882 | E | 3/1995 | Meyn |
| 5,429,549 | A | 7/1995 | Verrijp et al. |
| 5,439,702 | A | 8/1995 | French |
| 5,453,045 | A | 9/1995 | Hobbel et al. |
| 5,462,477 | A | 10/1995 | Ketels |
| 5,470,194 | A | 11/1995 | Zegers |
| 5,487,700 | A | 1/1996 | Dillard |
| 5,505,657 | A | 4/1996 | Janssen et al. |
| 5,549,521 | A | 8/1996 | van den Nieuwelaar et al. |
| D37,388 | S | 9/1996 | Dillard |
| 5,569,067 | A | 10/1996 | Meyn |
| 5,595,066 | A | 1/1997 | Zwanikken et al. |
| 5,605,503 | A | 2/1997 | Martin |
| 5,643,072 | A | 7/1997 | Lankhaar et al. |
| 5,643,074 | A | 7/1997 | Linnenbank |
| 5,672,098 | A | 9/1997 | Veraart |
| 5,676,594 | A | 10/1997 | Joosten |
| 5,704,830 | A | 1/1998 | Van Ochten |
| 5,713,786 | A | 2/1998 | Kikstra |
| 5,713,787 | A | 2/1998 | Schoenmakers et al. |
| 5,741,176 | A | 4/1998 | Lapp et al. |
| 5,755,617 | A | 5/1998 | van Harskamp et al. |
| 5,759,095 | A | 6/1998 | De Weerd |
| 5,766,063 | A | 6/1998 | Hazenbroek et al. |
| 5,782,685 | A | 7/1998 | Hazenbroek et al. |
| 5,785,588 | A | 7/1998 | Jacobs et al. |
| 5,803,802 | A | 9/1998 | Jansen |
| 5,810,651 | A | 9/1998 | De Heer et al. |
| 5,810,653 | A | 9/1998 | Van Craaikamp et al. |
| 5,813,908 | A | 9/1998 | Craaikamp |
| 5,827,116 | A | 10/1998 | Al et al. |
| 5,833,527 | A | 11/1998 | Hazenbroek et al. |
| 5,865,672 | A | 2/1999 | Hazenbroek |
| 5,875,738 | A | 3/1999 | Hazenbroek et al. |

(56) References Cited

U.S. PATENT DOCUMENTS

| | | |
|---|---|---|
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Janset et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 * | 7/2004 | Hazenbroek et al. ......... 452/188 |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 986,707 A1 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | Van Den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van Den Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

OTHER PUBLICATIONS

PCT/NL2011/050268—International Preliminary Report on Patentability and Written Opinion, Oct. 23, 2012, Foodmate B.V.

* cited by examiner

SHACKLE ALIGNMENT SYSTEM AND METHOD

REFERENCE TO RELATED APPLICATION

Priority is hereby claimed under 35 USC §119 to the filing date of Dutch patent application number N2004573 entitled Turning Block Alignment, filed in the Netherlands on 19 Apr. 2010.

TECHNICAL FIELD

This disclosure relates generally to food processing systems having overhead conveyor systems with rotatable or indexable suspension hangers. More specifically, the disclosure relates to animal processing systems having overhead suspension hangers or shackles for suspending slaughtered animal carcasses, such as poultry carcasses, by their legs to be conveyed past sequential stations of the processing system.

BACKGROUND

Suspension hooks attached to and carried by overhead conveyor chains are commonly use on poultry and fowl processing lines. Such suspension hooks are commonly referred to as shackles. Poultry carcasses are suspended by their legs from respective ones of the shackles and are carried by the conveyor chains past and through various processing stations of the processing line. Such stations might include, for example, eviscerators, cut-up stations, wing cutters, and other machines that cut-up and otherwise process poultry carcasses. European patent 0786208 discloses a poultry support shackle that includes a trolley that is suspended from and moved by a conveyor chain along a conveyor track. Poultry suspension hooks or shackles from which poultry carcasses can be suspended are rotatably mounted to the trolley. An associated turning gear is configured to cooperate with turning pins along the track to rotate the poultry suspension hooks, and thus carcasses suspended therefrom, into predetermined rotary orientations as the trolleys move past the turning pins. This feature is desirable because the carcasses may need to be rotated to different orientations to be presented properly to the various processing stations of the line.

At the locations of individual processing stations, the turning gear is usually retained in its orientation between opposite parallel side guides to inhibit rotation of the turning gear and thus the suspension hook and a poultry carcass suspended therefrom when the suspended poultry carcass is being processed at the processing station. In between processing stations, these parallel side guides may be interrupted or eliminated. The side guides are also interrupted at orienting stations between processing stations where the turning gear is engaged by turning pins to effect rotation of the turning gear and the suspension hook to orient a suspended poultry carcass properly for processing at the next processing station. More specifically, the turning gear, which is a substantially square body, has slots extending inwardly from its corners. These slots are engageable by a turning pin or pins positioned along the conveyor path to rotate the turning gear and suspension hook to a predetermined rotary orientation. A yieldable indexing arrangement, such as a spring biased ball and detent, between the trolley and the turning gear ensures that the rotary orientation is retained as the support shackle moves further along the conveyor. This is of particular importance at locations where lateral side guides are interrupted or not present to maintain the suspension hooks and birds in a desired orientation.

Usually the yieldable indexing arrangement is effective to keep the turning blocks and their suspension hooks in their proper rotary orientations between treatment stations. However, and particularly given the open arrangement of poultry processing lines, there is a risk that accidental external obstructions in the path of the conveyor may unintentionally alter the rotational orientation of a turning block in-between treatment stations. Should this occur and remain undetected, a wrongly oriented suspension hanger and poultry carcass suspended therefrom can cause damage to treatment stations, or at least result in a treated poultry product that is defective and must be discarded.

Accordingly, there is a need for a turning block and suspension hook alignment system for an overhead conveyor adapted to overcome or ameliorate at least one of the disadvantages of the prior art. There also is a need for alternative structures for poultry shackle assemblies that are less complex and cumbersome in assembly and operation and that moreover can be made relatively inexpensively. Alternatively, a need at least exists to provide the consumer with a useful choice. It is to a shackle assembly and method, particularly for poultry processing lines, that meets these and other needs in the industry that the present disclosure is primarily directed.

SUMMARY

Dutch patent application N2004573 to which priority is claimed above is hereby incorporated by reference in its entirety.

Briefly described, a conveyor system is disclosed for conveying suspended animal carcasses, and specifically poultry carcasses, in spaced sequential fashion along a poultry processing line. Various processing machines are located at processing stations along the line, and each processing machine performs a corresponding processing function on the suspended carcasses. The conveyor system includes a conveyor rail and a plurality of carriages that ride along the rail. The carriages are secured in a spaced sequential arrangement to a conveyor chain that pulls the carriages along the conveyor rail and along the processing line.

A carriage block is suspended from each carriage and a turning block is rotatably secured to the lower surface of each carriage block. A shackle is fixed to and hangs downwardly from each turning block and is configured to suspend a poultry carcass by its legs for movement along the line. Thus, rotation of the turning block relative to the carriage block also rotates the shackle attached thereto and a poultry carcass suspended from the shackle. A turning block alignment device or station may be arranged upstream of one or more processing or treatment stations along the line. The alignment station includes projecting pins that can engage the turning block as it is conveyed along the conveyor and through the aligning station. Peripheral surfaces and slots formed on the turning blocks are configured to engage or bypass selected pins in such a way that the turning block, shackle, and a poultry carcass suspended therefrom, always exits the alignment station in the same orientation regardless of its orientation when entering the alignment station. Thus, a wrongly oriented carcass is rotated to the proper orientation just prior to encountering a treatment or processing station. The mechanisms of the station are thereby protected from possible damage or malfunction due to a wrongly oriented suspension shackle and instances of defective product are greatly reduced.

Further advantageous features and aspects of the invention will become more apparent upon review of the detailed description of an exemplary embodiment presented below in conjunction with the appended drawing figures, which are briefly described as follows.

DETAILED DESCRIPTION

Figure 1:
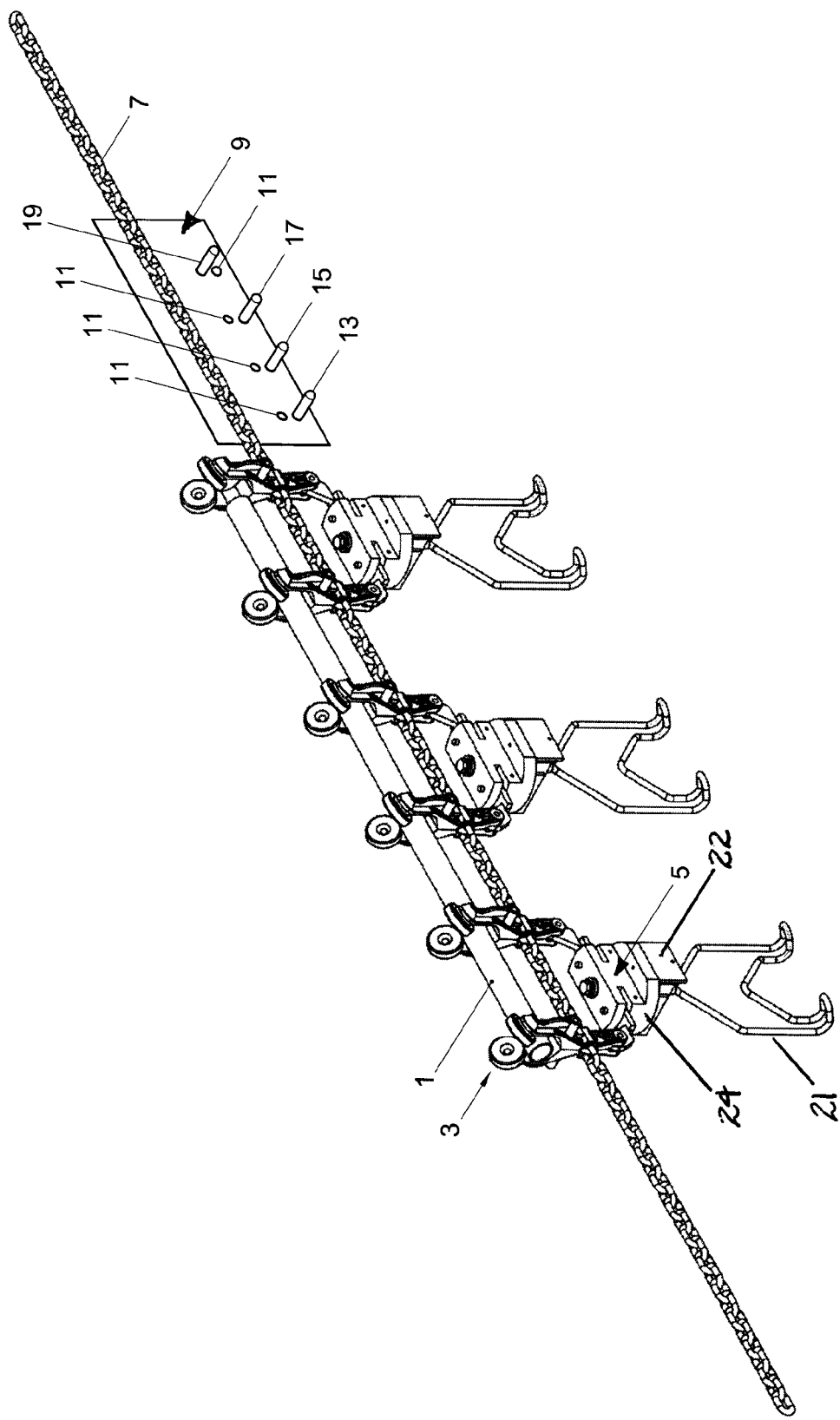
FIG. 1 is a partial perspective view of a conveyor according to one embodiment of the disclosure and particularly useful in a poultry processing line.

Reference will now be made in more detail to the drawing figures, wherein like reference numerals may identify like parts throughout the several views. Referring first to FIG. 1 there is shown a conveyor rail 1 that here takes the form of a pipe or rod. Guided or suspended for movement along the rail 1 are pairs of trolleys 3 having, in this case, rollers or wheels that roll along the conveyor rail 1. The trolleys 3 are attached at spaced intervals to and are interconnected by a chain 7, which pulls the trolleys 3 along the rail 1. A carriage assembly 5 is attached to and suspended from each trolley 3 and each carriage assembly 5 includes a shackle 21 depending from a turning block 22 that is rotatably mounted to a carriage block 24. Rotation of the turning blocks 22 relative to their carriage blocks results in rotation of the corresponding shackle 21 and a poultry carcass suspended therefrom relative to the conveyor rail 1.

Positioned along a conveying path defined by the rail 1 is a combined aligning and turning station 9. The aligning and turning station 9 may include a plate provided with rows of openings 11 at two levels, one above the other. The openings 11 are sized to receive turning pins such as, for example, a respective first, second, third or fourth turning pin 13, 15, 17, 19, that project from the plate partially into the path of turning blocks 22 as the carriages 5 are conveyed along the path defined by the rail 1. The turning blocks 55 thus may engage by one or more of the turning pins as the carriages 5 move through or past the aligning and turning station 9. When a turning block engages a turning pin, the pin causes the turning block to rotate or index to a new orientation, as described in more detail below.

Figure 2:
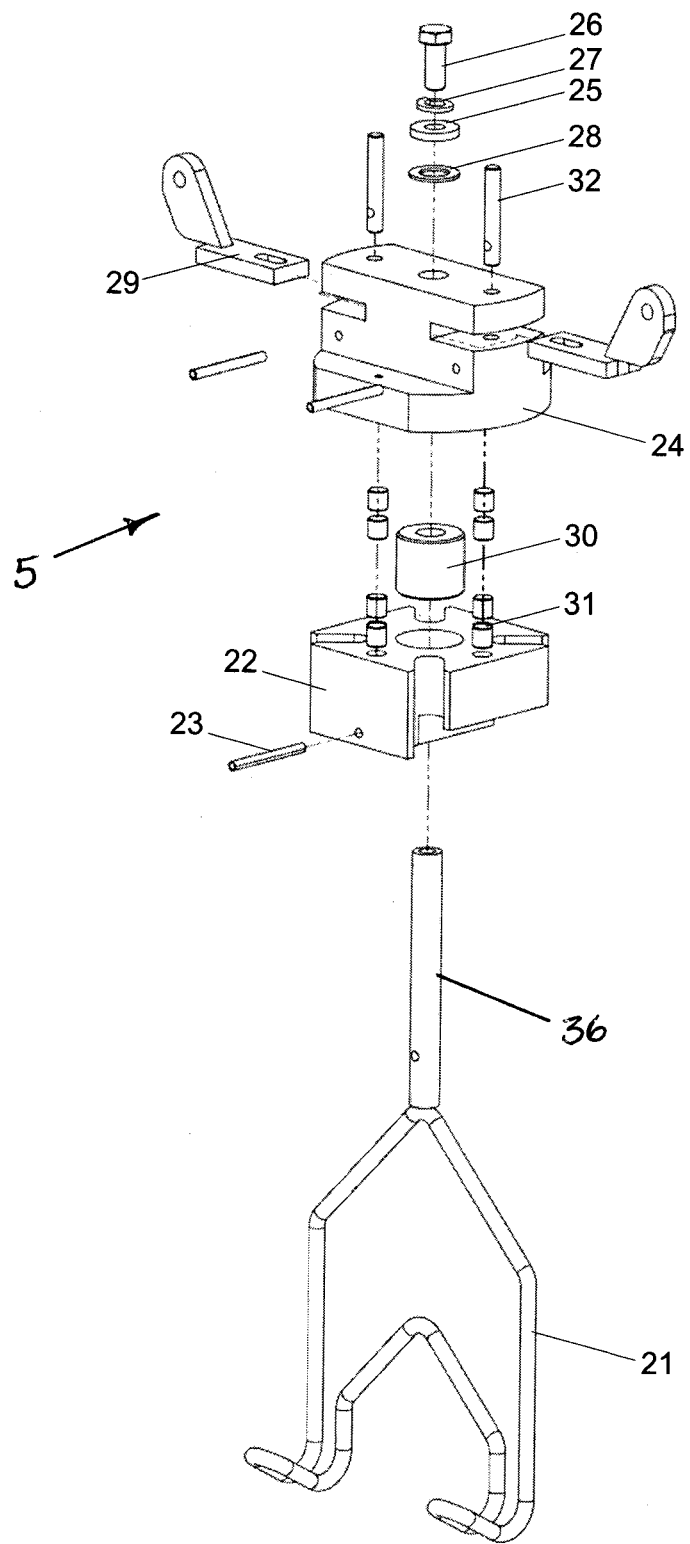
FIG. 2 is an exploded perspective view of a carriage block and rotatable turning block and shackle according to one exemplary embodiment.

FIG. 2 illustrates a carriage 5 in an exploded arrangement and shows details of the carriage block, turning block, and suspension shackle according to one embodiment of the disclosure. A suspension shackle 21 is non-rotatably connected to and depends from the turning block 22. A retention pin 23 is inserted through both the shaft 36 of the shackle 21 and the turning block 22 to obtain the non-rotatable connection between the two. The carriage block 24 rotatably receives the turning block 22 by means of a bolt 26 and various washers 25, 27 and 28. The bolt 26 may engage a bushing 30 that affixes to the turning block 22. Alternatively, the shaft 36 of the suspension shackle may have an internally threaded upper end and may extend rotatably through the bushing 30 and upwardly and also rotatably through the carriage block 24. In such alternate embodiment, the bolt 26 is threaded into the end of the shaft of the support shackle and the washers 25, 27, and 28 facilitate rotation of the shaft (and thus the turning block and support shackle) with respect to the carriage block.

The carriage block 24 is suspended from the trolleys 3 (only shown in FIG. 1), by trolley brackets 29. Each trolley bracket 29 is secured in a slot in the carriage block 24 and affixed by a respective securing pin 32. Preferably, the trolley brackets 29 have elongated openings through which the securing pins 32 extend to permit the trolley brackets both to rotate with respect to and move toward and away from the carriage block. This, in turn, facilitates movement of the carriages around relatively sharp turns that they may encounter as they traverse a circuitous conveyor rail extending along the processing path.

When the turning block is indexed by an encounter with a turning pin, it preferably is yieldably retained in its indexed orientation or position by any appropriate mechanism. In the illustrated embodiment, the turning block 22 is retained in indexed positions with respect to the carriage block 24 by sets of magnets 31 embedded within the turning block and the carriage block. The magnets align when the turning block is in an indexed orientation and, through attraction, hold the turning block firmly but yieldably in the indexed orientation. Other equivalent means, such as a ball, spring, and detent arrangement also may be used.

Figure 3:
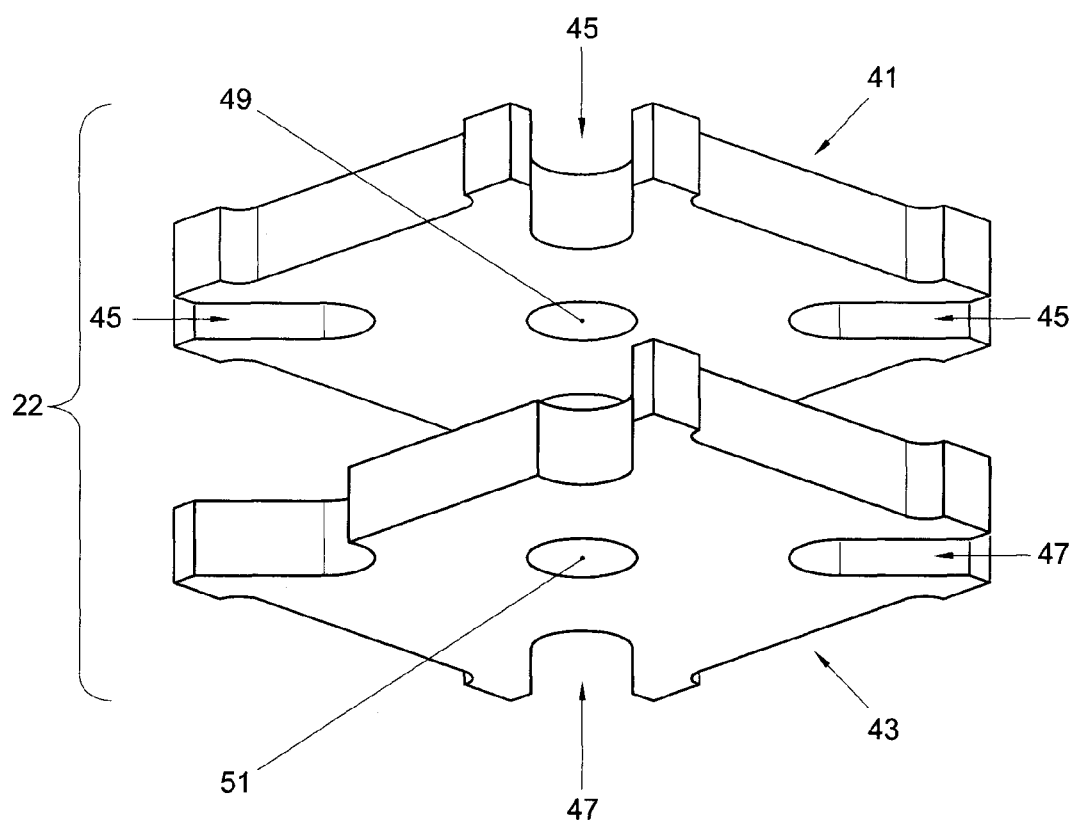
FIG. 3 is an exploded perspective view of the turning block shown in FIG. 2.

In FIG. 3 a possible embodiment of the turning block 22 is shown in an exploded perspective view. The turning block 22 in this exemplary embodiment is seen to comprise an upper level disk 41 and a lower level disk 43. The upper level disk 41 has a generally square shape or perimeter, interrupted by four diagonally extending slots 45 opening into the corners of the square perimeter and extending inwardly there from. The lower level disk 43 is similarly shaped to the upper level disk 41, but is truncated along at least one side (the facing side in FIG. 3) relative to the upper level disc 41. The lower level disc 43 is thus substantially shorter on its truncated side and thereby effectively only has two diagonally extending slots 47 at the corners of the opposite side. The upper and lower level disks 41, 43 each have a respective central bore 49, 51. In practice, the upper and lower level discs may be separate components affixed together with an appropriate fastener or adhesive. Preferably, however, the upper and lower level discs are machined, molded, or otherwise formed from a unitary block of material such as, for example, a high density polymer. While two discs are shown and described herein, it will be understood that the turning block also may be formed with three or more discs and that each disc may be truncated along one, two, or three of its sides. Each of the discs facilitate a desired indexed orientation by encountering or not encountering corresponding pins as the turning block passes through aligning stations. Two discs are shown for simplicity in the figures but it will be understood that the principles discussed with respect to the two discs also apply to a turning block with three or more discs.

Figure 4A:
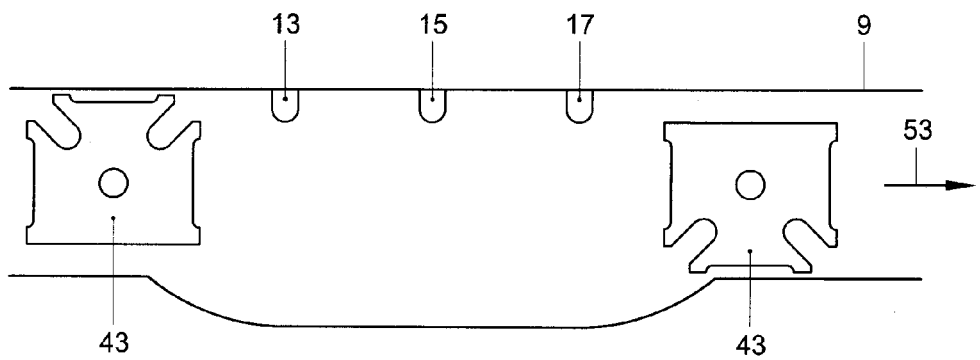
FIGS. 4A-4C are schematic views showing the lower disc of the turning block moving through an alignment station according to the disclosure to orient the turning block and its attached shackle to a desired orientation.
Figure 4B:
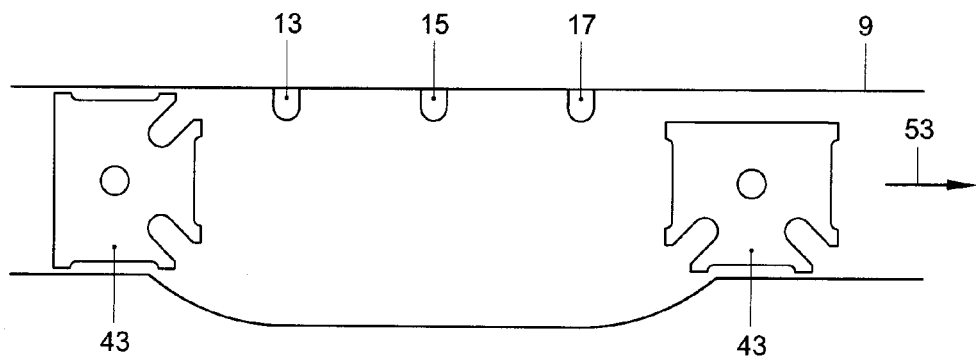
Figure 4C:
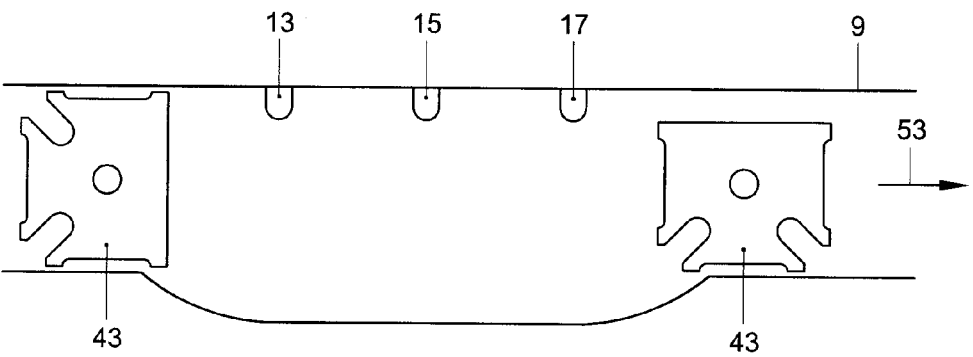

FIGS. 4A-4C illustrate the passage of the lower level disc 43 with its truncated side through an alignment and turning station 9 (FIG. 1) to index the turning block to the proper orientation. As the disc 43 moves through the alignment and turning station, it may or may not engage one or more of the turning pins 13, 15, and 17. More specifically, if, when approaching a pin, the lower level disc 43 is oriented such that its truncated side faces the pin, then the pin will be too short to engage the disc and no indexing will occur. If, however, the lower level disc approaches a pin with any other side facing the pin, then the pin will engage the lower level disc causing it to rotate or index by ninety degrees, whereupon the magnets again hold the turning block in its newly indexed orientation. This indexing occurs at each turning pin until the truncated side of the lower disc faces the pins. As a result, as shown schematically in FIGS. 4A-4C, the lower level disk 43, irrespective of the orientation in which it enters the alignment and turning station, will end up in the predetermined position shown on the right in these figures. As can be seen in either one of the FIGS. 4A, 4B and 4C the orientation of the lower level disk 43 after passing the first, second and third turning pins 13, 15, 17 is the same even though the lower level disc entered the aligning and turning station is three different orientations. Of course, if the lower level disc enters the aligning and turning station already in the proper orientation, then it will not encounter any of the pins and thus will remain in the proper orientation when it emerges from the station. This may be used to correct the rotative positions or orientations of the supports (carriages 5 in FIG. 1 and the shackle 21 of FIG. 2) before they and their suspended poultry carcasses encounter a treatment station that may be positioned along the processing path of the conveyor.

Figure 5A:
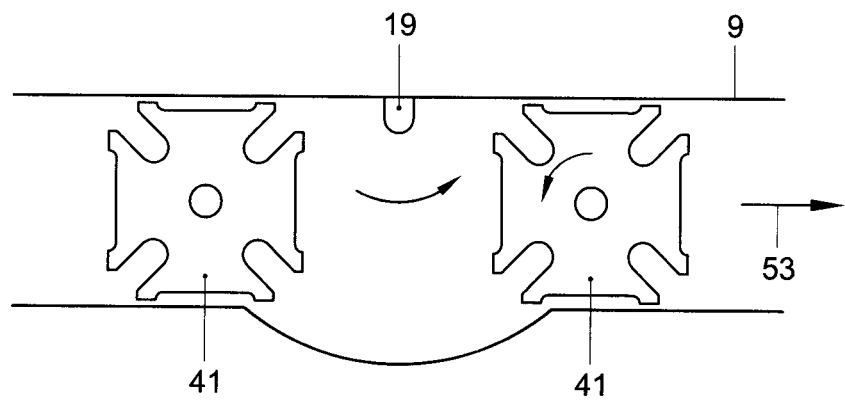
FIGS. 5A-5B are schematic views showing the upper disc of the turning block moving through an alignment station to rotate the turning block in a desired direction.
Figure 5B:
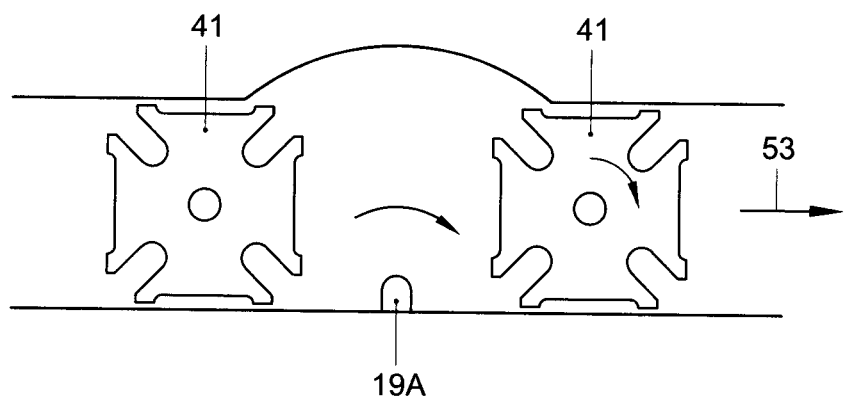

FIGS. 5A and 5B are schematic representations, similar to FIG. 4, but showing the upper level disk 41 being rotated or indexed through 90 degree increments. This rotation in increments of 90 degrees can be in a left hand rotational direction by a fourth turning pin 19 aligned with the upper level disc or alternatively in a right hand rotational direction by a fourth turning pin 19A that extends from an opposite side of the conveying path, as shown in FIG. 5B. Thus, judicious placement of the fourth or additional turning pins along the upper row of openings in the plate of the aligning and turning station can index the shackle in either direction by increments of ninety degrees, which may be advantageous in many applications.

It will thus be seen that with the proper selection and placement of turning pins in the openings of the aligning and turning station, it can be assured that the carriages and thus their shackles and poultry carcasses suspended therefrom are always properly oriented when approaching and entering a processing station. This is true regardless of the orientations of the carriages upon entering the aligning and turning station. Instances of improperly oriented shackles and poultry carcasses are thus reduced substantially to zero.

It is believed that the operation and construction of the disclosed apparatus will be apparent from the foregoing description and drawings. To the skilled person in this field of the art, it will be clear that the invention is not limited to the exemplary embodiment represented and described here, but that within the framework of the appended claims a large number of variants, both subtle and gross, are possible. Also kinematic inversions are considered inherently disclosed and to be within the scope of the invention. The terms "comprising" and "including" when used in this description or the appended claims should not be construed in an exclusive or exhaustive sense but rather in an inclusive sense. Features not specifically or explicitly described or claimed may be additionally included in the structure according to the present invention without deviating from its scope. While the invention has been exemplified herein with a turning block formed with two discs, the invention is not so limited and the turning block may have three or more discs or disc portions for engaging with three or more rows of turning pins in the aligning stations to accomplish even more complicated or different indexing and orientation at various locations along the processing path. These and other additions, deletions, and modifications might well be made to the illustrated embodiments without departing from the spirit and scope of the invention, which is delineated only by the claims.

What is claimed is:

1. A conveyor for moving and positioning objects along a conveyor path, the conveyor comprising:
   a conveyor rail extending along the conveying path;
   at least one carriage movable along the conveyor rail;
   an article support rotatably mounted with respect to the carriage;
   a turning block associated with the article support, rotation of the turning block causing corresponding rotation of the article support;
   an aligning station in the path of the turning block for rotating the turning block and article support to a predetermined orientation;
   the turning block having a first disk with a first perimeter contour and a second disk with a second perimeter contour, and
   the aligning station including features for selectively engaging at least the second disk as the turning block moves through the aligning station to rotate the article support into the predetermined orientation;
   the features of the aligning station including a series of first, second, and third turning pins arranged and positioned to engage at least the second disk.

2. A conveyor according to claim 1, wherein the first disk is an upper level disk and the second disk is a lower level disk.

3. A conveyor according to claim 1, wherein the first and second disk are formed as a single unitary element.

4. A conveyor according to claim 1, wherein the aligning station has a first row of openings substantially aligned with the first disk and a second row of openings substantially aligned with the second disk, and wherein each of the first and second rows of openings is adapted to receive any one of at least the first, second and third turning pins for engaging the second disk and alternatively a fourth turning pin for engaging the first disk.

5. A conveyor according to claim 1, wherein the first disk has a substantially square perimeter with slots extending diagonally inwardly from each of its four corners, and wherein the second disk has a substantially rectangular perimeter with two slots extending diagonally inwardly from two of its corners.

6. A conveyor according to claim 1, wherein the conveyor is an animal carcass conveyor for use in a poultry and/or fowl processing line.

7. A conveyor for moving and orienting objects along a conveyor path, the conveyor comprising:
   a conveyor rail extending along the conveying path;
   at least one carriage movable along the conveyor rail;
   an article support rotatably mounted to the carriage;
   a turning block coupled to the article support, rotation of the turning block causing corresponding rotation of the article support;
   an aligning station in the path of the turning block for rotating the turning block and article support to a predetermined orientation;
   the turning block having a first disk with a first perimeter contour and a second disk with a second perimeter contour different from the first perimeter contour, and
   a plurality of turning pins selectively mountable in the aligning station, the turning pins, when mounted in the aligning station, extending into the path of at least the second disk for engagement with at least the second disc when the article support is not in the predetermined orientation to rotate the article support to the predetermined orientation.

8. A conveyor as claimed in claim 7 wherein the aligning station has a first row of openings horizontally aligned with the first disk and a second row of openings horizontally aligned with the second disk, and wherein each opening of the first and second rows of openings is adapted to receive one of the plurality of turning pins.

9. A conveyor as claimed in claim 8 wherein the first row of openings comprises three openings.

* * * * *

UNITED STATES PATENT AND TRADEMARK OFFICE
CERTIFICATE OF CORRECTION

Page 1 of 1

PATENT NO.         : 8,678,176 B2
APPLICATION NO.    : 13/011056
DATED              : March 25, 2014
INVENTOR(S)        : Jacobus Eliza Hazenbroek It is certified that error appears in the above-identified patent and that said Letters Patent is hereby corrected as shown below:

On the Title Page

The following correction is under Foreign Application Priority Data

Item (30)   Apr. 19, 2010   (DK)..........................N2004573
            should read
      (30)  Apr. 19, 2010   (NL)..........................N2004573

Signed and Sealed this
Twenty-first Day of October, 2014

Michelle K. Lee
*Deputy Director of the United States Patent and Trademark Office*